Feb. 12, 1924.

D. A. ALLEE

PIPE CONNECTION

Filed Aug. 29, 1921

1,483,499

Inventor:
David A. Allee,
by
His Attorney.

Patented Feb. 12, 1924.

1,483,499

UNITED STATES PATENT OFFICE.

DAVID A. ALLEE, OF SCHENECTADY, NEW YORK, ASSIGNOR TO GENERAL ELECTRIC COMPANY, A CORPORATION OF NEW YORK.

PIPE CONNECTION.

Application filed August 29, 1921. Serial No. 496,330.

*To all whom it may concern:*

Be it known that I, DAVID A. ALLEE, a citizen of the United States, residing at Schenectady, county of Schenectady, State of New York, have invented certain new and useful Improvements in Pipe Connections, of which the following is a specification.

The present invention relates to pipe connections and especially pipe connections of the type wherein the adjacent pipe ends to be united are provided with flanges which are fastened together by a ring of bolts.

The object of my invention is to provide an improved pipe coupling which is particularly well adapted for pipe lines intended to handle fluids of high pressure and temperature, for example, high pressure steam, and for a consideration of what I believe to be novel and my invention, attention is directed to the accompanying description and the claims appended thereto.

Figure 2:
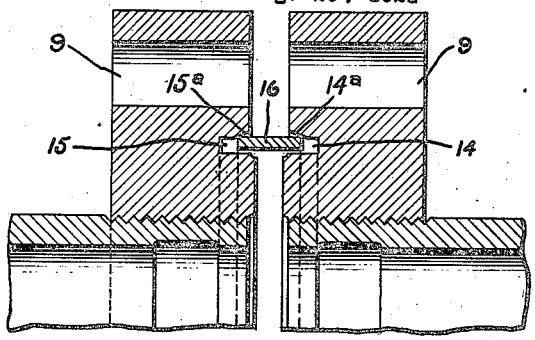
Figure 1:
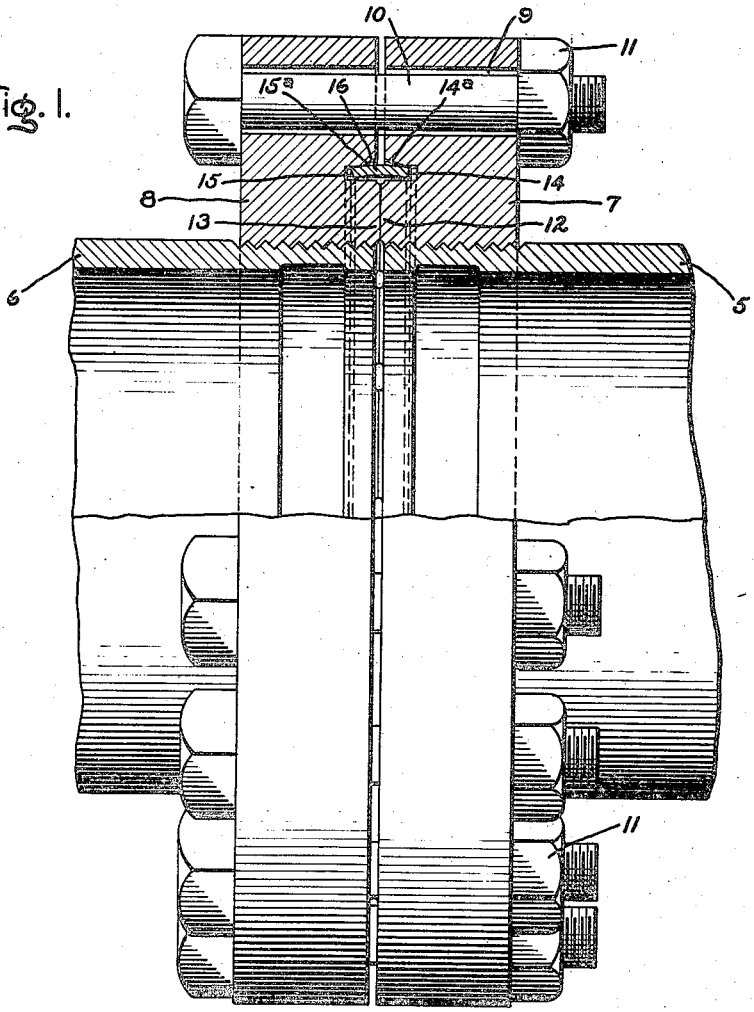

In the drawing, Fig. 1 is a side elevation partly in section of a pipe coupling embodying my invention, and Fig. 2 is a detail view illustrating the manner of inserting the sealing or packing ring.

Referring to the drawing, 5 and 6 indicate adjacent ends of pipe sections to be united. On such ends are flanges 7 and 8 which may be attached to the ends in any suitable manner as by being threaded thereon as indicated. At their peripheries flanges 7 and 8 are provided with rings of holes 9 through which extend bolts 10 by means of which the flanges are drawn together when nuts 11 are screwed up. The flanges are arranged to engage each other at their radially inner portions when drawn together and preferably remain slightly spaced apart at their radially outer portions, these latter being the portions through which the bolts 10 pass. To this end the inner portions of the flanges may be regarded as being provided with annular projections 12 and 13 or, on the other hand, the outer portions may be regarded as having been cut away.

At a point just beyond or outside projections 12 and 13 the adjacent faces of the flanges are provided with annular axially extending recesses 14 and 15 of suitable width and depth, the radially outer edge of each recess being beveled at its entrance as indicated at 14ᵃ and 15ᵃ. Located between flanges 7 and 8 with its ends in recesses 14 and 15 is an annular sealing or packing ring 16 of a suitable metal which possesses some spring or resiliency. The ring is curved or bowed outward as shown in Fig. 1 and its inner corners bite into the inner surfaces of recesses 14 and 15.

An understanding of the sealing or packing ring and the manner in which it functions may be obtained best by a consideration of the way the joint is assembled. As shown in Fig. 2, the sealing ring comprises originally a straight cylindrical ring of a length somewhat less than the combined depth of recesses 14 and 15. Its internal diameter is slightly greater than the diameter of the inner walls of recesses 14 and 15 and its external diameter is such that the outer corners strike on beveled entrance edges 14ᵃ and 15ᵃ. The parts are first assembled as shown in Fig. 2 after which the bolts 10 are inserted in holes 9 and nuts 11 then screwed up to pull the flanges together bringing projections 12 and 13 into engagement. As the flanges are moved toward each other, beveled edges 14ᵃ and 15ᵃ force the two ends of ring 16 inward so that it becomes curved or bowed outwardly as shown in Fig. 1, the inner corners of the ring biting into the surfaces of recesses 14 and 15. The ends of the ring are thus wedged in recesses 14 and 15 and form a tight seal. The bowing out of the ring gives it a spring action which serves to press it toward the sealing position.

It will be noted in connection with my structure that the pipe flanges are drawn entirely together by the bolts so that the entire stress in compression is taken by the pipe itself. This means that when the bolts are fully tightened there will be no reversal of stress of any kind, the bolts staying in exactly the same state of stress except for such changes as may occur due to temperature changes in the flanges and bolts and to mechanical stresses, which may be occasioned by bending due to lateral forces. Because of this arrangement the packing or sealing ring 16 is not required to take any of the stresses of the joint due to expansion and contraction. Since ring 16 is bowed and is adapted to have a spring action, it will always remain tight, the spring action taking care of any variations caused by unequal expansion of the flanges and ring.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters of Patent of the United States, is,—

1. In a pipe coupling, flanges having opposed annular recesses in their adjacent faces, a bowed annular spring ring having its ends seated in said recesses, said annular spring ring having a mean diameter greater than the mean diameter of the annular recesses, a beveled edge in the radially outer walls of said recesses for radially compressing the ends of said annular ring as they enter said recesses and means for drawing the flanges into facial engagement.

2. In a pipe coupling, flanges having in their adjacent faces opposing annular recesses, an annular ring of rectangular cross section and of resilient material whose ends protrude into the recesses, said recesses each having a beveled outer wall and a depth greater than half the width of the annular ring, and means for drawing the flanges into facial engagement whereby the annular ring will be compressed radially near its ends by the beveled outer walls of the annular recesses and crimped into contact with inner walls of the annular recesses to form a tight connection between the flanges.

3. In a pipe coupling, flanges having opposing annular recesses in their adjacent faces, said recesses having a portion of their radially outer walls beveled whereby the recesses are made widest at the adjacent flange faces, an annular ring of rectangular cross section and of resilient material forced into said opposing recesses, said annular ring having a mean diameter greater than the mean diameter of the annular recesses and a width less than the aggregate depth of the annular recesses, and means for forcing the flanges into facial engagement whereby the annular ring will be radially compressed at its ends into contact with the walls of the annular recesses to form a tight connection between the flanges.

4. In a pipe coupling, flanges having opposed annular recesses in their abutting faces, a cylindrical packing means of spring material held in said recesses, said cylindrical packing means having an initial mean diameter greater than the mean diameter of the recesses into which it is forced, and a beveled means in the radially outer walls of the annular recesses for constraining the ends of said cylindrical packing to enter said annular recesses and assume a bowed shape whereby the edges of said packing form a joint with the radially inner walls of said recesses and whereby the radially outer walls of said recesses form a pressure supporting means for said packing.

5. In a pipe coupling, flanges having opposed annular recesses in their adjacent faces, an annular spring ring of larger external diameter than said annular recesses placed between the flanges, said recesses being provided with an entering bevel in each outer wall to meet and force the ends of said ring to enter the recesses when the flanges are drawn together, plane annular surfaces provided on said flanges through which they may come into facial engagement before the annular ring seats in the bottom of the recesses, and means for drawing the flanges into said facial engagement whereby the annular ring will be bowed into contact with walls of the recesses to form a joint between the flanges when said flanges are so engaged.

In witness whereof, I have hereunto set my hand this 26th day of August, 1921.

DAVID A. ALLEE.